(12) United States Patent
Distefano et al.

(10) Patent No.: US 10,296,314 B2
(45) Date of Patent: May 21, 2019

(54) DETECTING AND REMEDYING MEMORY LEAKS CAUSED BY OBJECT REFERENCE CYCLES

(71) Applicant: Facebook, Inc., Menlo Park, CA (US)

(72) Inventors: Dino Salvo Distefano, London (GB); Cristiano Calcagno, Zurich (CH); Dulma Churchill, Kings Langley (GB)

(73) Assignee: Facebook, Inc., Menlo Park, CA (US)

( * ) Notice: Subject to any disclaimer, the term of this patent is extended or adjusted under 35 U.S.C. 154(b) by 143 days.

(21) Appl. No.: 15/340,752

(22) Filed: Nov. 1, 2016

(65) Prior Publication Data

US 2018/0121178 A1  May 3, 2018

(51) Int. Cl.
*G06F 11/36* (2006.01)
*G06F 8/41* (2018.01)
*G06F 12/02* (2006.01)

(52) U.S. Cl.
CPC .......... *G06F 8/4434* (2013.01); *G06F 8/427* (2013.01); *G06F 8/4435* (2013.01); *G06F 11/3608* (2013.01); *G06F 12/0253* (2013.01)

(58) Field of Classification Search
CPC ........ G06F 8/4435; G06F 8/4434; G06F 8/41; G06F 11/073; G06F 11/3608; G06F 11/36; G06F 11/3604; G06F 11/366; G06F 12/02; G06F 12/0253
USPC ........................................................ 717/154
See application file for complete search history.

(56) References Cited

U.S. PATENT DOCUMENTS

| 5,644,709 | A  | * | 7/1997  | Austin     | G06F 11/366 |
|           |    |   |         |            | 711/154     |
| 6,823,507 | B1 | * | 11/2004 | Srinivasan | G06F 11/3604 |
|           |    |   |         |            | 714/E11.218 |
| 7,127,707 | B1 | * | 10/2006 | Mishra     | G06F 8/423  |
|           |    |   |         |            | 717/137     |
| 7,861,231 | B2 | * | 12/2010 | Rangarajan | G06F 11/366 |
|           |    |   |         |            | 717/126     |
| 8,719,791 | B1 | * | 5/2014  | MacPherson | G06F 9/4486 |
|           |    |   |         |            | 717/124     |

(Continued)

OTHER PUBLICATIONS

Distefano et al. "A local shape analysis based on separation logic", 2006, Proceedings of the 12th international conference on Tools and Algorithms for Constructiono ans Analysis of Systems, pp. 287-302 (Year: 2006).*

*Primary Examiner* — Jason D Mitchell
(74) *Attorney, Agent, or Firm* — FisherBroyles, LLP

(57) ABSTRACT

Exemplary methods, apparatuses, and systems parse programming code to identify instructions within the programming code to allocate objects and instructions within the programming code to create, delete, and/or update references to the objects. Based upon the identified instructions, a model of memory used when the programming code is executed is generated. The model includes representations of the objects and representations of changes to the references to the objects. Based upon the representations in the model, it is determined that each of a plurality of objects is connected to another of the plurality of objects by one of the references but unreachable by any variable at a point of execution of the programming code. In response to the determination that the plurality of objects is unreachable, a report is generated to flag the unreachable plurality of objects as a potential memory leak for correction.

20 Claims, 4 Drawing Sheets

(56) References Cited

U.S. PATENT DOCUMENTS

| | | | | |
|---|---|---|---|---|
| 8,856,186 B1* | 10/2014 | Li | ............ | G06F 12/0253 |
| | | | | 707/800 |
| 9,053,235 B1* | 6/2015 | Bienkowski | ........ | G06F 11/3604 |
| 9,201,758 B2* | 12/2015 | Calcagno | ............ | G06F 8/77 |
| 9,378,138 B2* | 6/2016 | Varma | ............ | G06F 12/0253 |
| 9,514,025 B2* | 12/2016 | Hay | ............ | G06F 9/45525 |
| 2002/0120640 A1* | 8/2002 | Hills | ............ | G06F 12/0261 |
| 2002/0129343 A1* | 9/2002 | Pinter | ............ | G06F 8/434 |
| | | | | 717/140 |
| 2005/0257203 A1* | 11/2005 | Nattinger | ............ | G06F 11/323 |
| | | | | 717/154 |
| 2008/0270482 A1* | 10/2008 | Hillberg | ............ | G06F 12/0253 |
| 2009/0327372 A1* | 12/2009 | Ylonen | ............ | G06F 12/0253 |
| 2010/0241675 A1* | 9/2010 | Young | ............ | G06F 9/4488 |
| | | | | 707/815 |
| 2011/0202906 A1* | 8/2011 | Asao | ............ | G06F 8/41 |
| | | | | 717/141 |
| 2012/0216076 A1* | 8/2012 | Macik | ............ | G06F 11/3612 |
| | | | | 714/38.1 |
| 2012/0272220 A1* | 10/2012 | Calcagno | ............ | G06F 8/77 |
| | | | | 717/125 |
| 2014/0309970 A1* | 10/2014 | Kelsey | ............ | G06Q 10/063 |
| | | | | 703/1 |
| 2017/0123790 A1* | 5/2017 | Gupta | ............ | G06F 11/3604 |
| 2017/0185504 A1* | 6/2017 | Krishnan | ............ | G06F 11/3604 |

* cited by examiner

```
Class A                    200
    B*a

Class B
    C*b

Class C
    B*c main() {
    A x = new();      ← 230
    x.b = new();      ← 235
    x.b.c = new();    ← 240
    x.b.c = x.b;      ← 245
    ...
    x.b = nil;        ← 250
    ...
}
```

FIG. 3

```
                    empty                                    300
310 →    x▫→ -
315 →    x▫→ { b:t } * t▫→ -
320 →    x▫→ { b:t } * t▫→ {c:t1} * t1▫→ -
325 →    x▫→ { b:t } * t▫→ {c:t1} * t1▫→ {c:t}
330 →    x▫→ {b:nil} * t▫→ {c:t1} * t1▫→ {c:t}
```

```
Class A                                              305
      B*a

Class B
      C*b

Class C
      B*c main() {
      A x = new();
      x.b = new();
      x.b.c = new();
      x.b.c = x.b;
      ...
      x.b = nil;    //Warning: potential memory leak    ← 335
      ...
}
```

DETECTING AND REMEDYING MEMORY LEAKS CAUSED BY OBJECT REFERENCE CYCLES

FIELD

The various embodiments described herein relate to detecting and remedying memory leaks. In particular, embodiments detect and report potential memory leaks by identifying object reference cycles in programming code that are unreachable by any variable at a point of execution of the programming code.

BACKGROUND

Object-oriented programming code includes the allocation and referencing of objects. For example, an object may be a variable, data structure, or function. One object may reference another object, e.g., using a pointer. When an object is allocated during execution of the programming code, memory is provided for that object. Memory usage is managed by tracking incoming references for each object. As references are removed from an object, the incoming reference count is decreased. Objects are flagged for garbage collection/deallocation when the incoming reference count of an object reaches zero. Two objects, however, may have a cycle of references between them and, if the only other incoming reference to one of the objects from elsewhere is moved or removed, the code may be left with two objects that refer to each other but are not reachable by a program variable or otherwise by the executed programming code. In such a scenario, this cycle of objects will leave two objects that should probably be deallocated but will not be flagged for garbage collection because each has an incoming reference count of one.

SUMMARY OF THE DESCRIPTION

Exemplary methods, systems, and apparatuses include parsing programming code to identify instructions within the programming code to allocate objects and instructions within the programming code to create, delete, and/or update references to the objects. Based upon the identified instructions, a model of memory used when the programming code is executed is generated. The model includes representations of the objects and representations of changes to the references to the objects. For example, during compilation of the programming code, separation logic may be used to model objects and references.

Based upon the representations in the model, it is determined that each of a plurality of the objects is connected to another of the plurality of objects by one of the references but unreachable by any variable at a point of execution of the programming code. For example, the plurality of objects within the model may include a first object and a second object. The references include a first reference from the first object to the second object and a second reference from the second object to the first object. A removal or modification of a third reference to the first or second object at a point of execution of the programming code may cause the first and second objects to become unreachable. The determination that the plurality of objects is unreachable includes determining, at or following that point of execution of the programming code, that the first reference is the only incoming reference for the second object and that the second reference is the only incoming reference for the first object.

In response to the determination that the plurality of objects is unreachable, a report is generated to flag the unreachable plurality of objects as a potential memory leak for correction. In one embodiment, generating the report includes modifying the programming code to include a comment flagging the unreachable plurality of objects. In one embodiment, the report includes a recommendation to replace a strong reference with a weak reference.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIG. 3 illustrates another model of memory during execution of the programming code and generated report flagging an unreachable plurality of objects as a potential memory leak for correction.

DETAILED DESCRIPTION

Embodiments described herein detect and report potential memory leaks by identifying object reference cycles in programming code that are unreachable by any variable at a point of execution of the programming code. For example, the reporting may include modifying the programming code to flag the potential memory leak. As a result, developers are enabled to quickly correct memory leaks and generate programming code that uses memory more efficiently and improves the operation of the computer executing the programming code.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
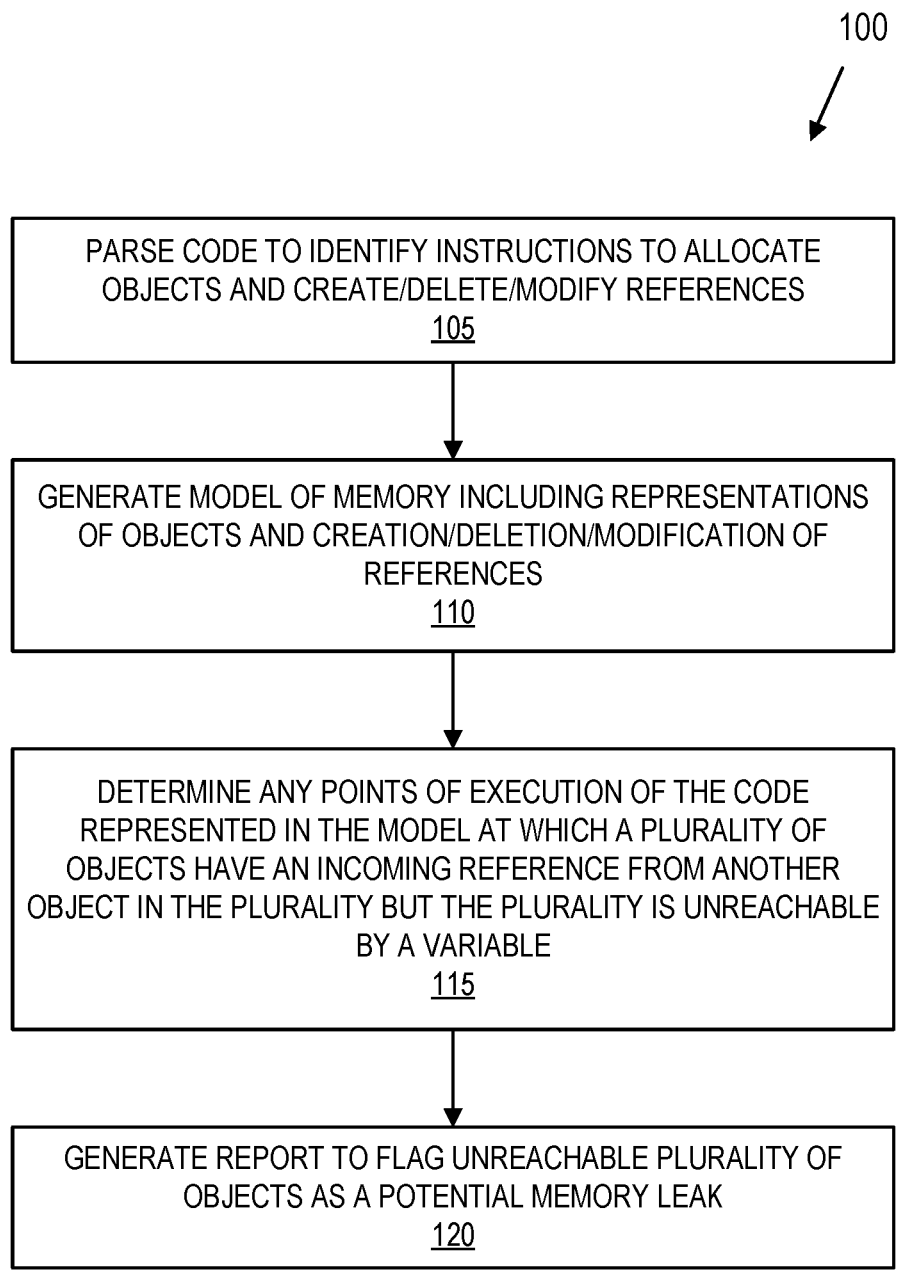
FIG. 1 is a flow chart illustrating an exemplary method of detecting and remedying memory leaks caused by unreachable object reference cycles.

FIG. 1 is a flow chart illustrating exemplary method 100 of detecting and remedying memory leaks caused by unreachable object reference cycles. At block 105, a computer parses programming code to identify instructions to allocate objects and instructions to create, delete, and/or modify object references. In one embodiment, the computer parses the programming code during or otherwise as a part of compiling the programming code. Alternatively, method 100 is performed independently of a compiler and compilation of the programming code.

In one embodiment, the computer parses the programming code by referencing a list of instructions used to allocate objects and create, delete, and/or modify object references. The list of instructions may be dependent upon the programming language used in the programming code. For example, the computer may determine the programming language used in the programming code by identifying an extension of the file name. Once the programming language is identified, the computer selects the corresponding set of instructions.

At block 110, based upon the parsing of the programming code, the computer generates a model of memory including representations of objects and object references. The model illustrates, at each of multiple points of execution of the programming code, objects that have been allocated and references between objects that have been created, deleted, and/or modified by the parsed programming code. For example, the computer uses separation logic or another form of logic or abstraction to model memory usage during the execution of the programming code. An example of such a model is described with reference to FIGS. 2 and 3.

At block 115, the computer determines if there are any points of execution of the programming code represented in the model at which a plurality of objects have an incoming reference from another object in the plurality objects but the plurality of objects is unreachable by a variable or otherwise. For example, the plurality of objects within the model may include a first object and a second object. The references include a first reference from the first object to the second object and a second reference from the second object to the first object. The first and second objects are in a reference cycle or loop. A removal or modification of a third reference to the first or to the second object at a point of execution of the programming code may cause the first and second objects to become unreachable. The determination that the plurality of objects is unreachable includes determining, at or following that point of execution of the programming code, that the first reference is the only incoming reference for the second object and that the second reference is the only incoming reference for the first object. An example of such a reference cycle between unreachable objects is described with reference to FIGS. 2 and 3.

At block 120, the computer generates a report to flag the unreachable plurality of objects as a potential memory leak in response to the determination. In one embodiment, generating the report includes the computer modifying the programming code to include a comment flagging the unreachable plurality of objects. For example, the comment may be added to the line of code determined from the model to include an instruction to delete or modify a reference that results in the unreachable cycle of objects. In one embodiment, generating the report includes a recommendation to replace a strong reference with a weak reference.

In one embodiment, the computer generates the report in a user interface that enables a user to edit the programming code. For example, the recommendation to replace a strong reference with a weak reference may include a user-selectable interface element that, when selected, causes the computer to edit the programming code to make the recommended replacement. In another embodiment, user interaction with the user-selectable interface element enables the user to manually edit the programming code to address the flagged memory leak.

Figure 2:
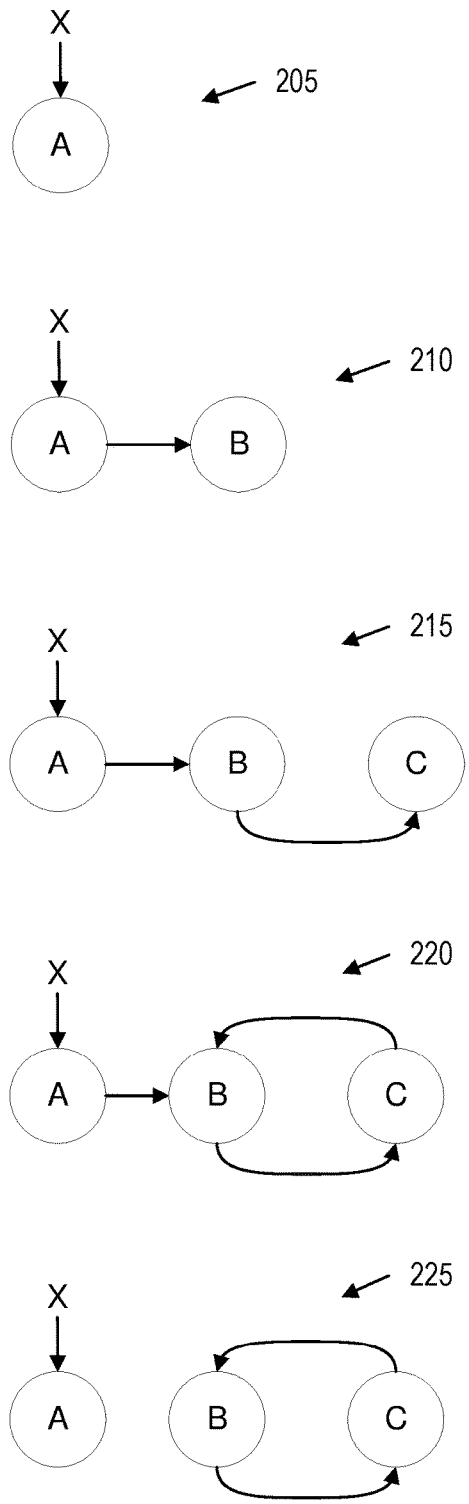
FIG. 2 illustrates exemplary programming code and a corresponding model of memory during execution of the programming code.

FIG. 2 illustrates exemplary programming code 200 and a corresponding block diagram model of memory during execution of programming code 200. Programming code 200 may include additional instructions than illustrated. For the sake of the present description, programming code 200 is illustrated as including instructions 230-250 focused on the allocation of objects and creation and deletion of references. When an embodiment parses programming code 200, e.g., as described with reference to FIG. 1, a model of memory may be generated. FIG. 2 includes a simplified block diagram model of the memory generated by parsing programming code 200.

Programming code 200 includes three classes, A, B, and C. Objects of each class are defined to fields that reference objects of other classes. For example, a new object of class A is allocated using variable X in programming code line 230 and illustrated by block diagram 205. An object of class B is allocated as a field of and referenced by the previously allocated object of class A in programming code line 235 and illustrated by block diagram 210. An object of class C is allocated as a field of and referenced by the previously allocated object of class B in programming code line 240 and illustrated by block diagram 215. A reference is created from the object of class C to the object of class B at programming code line 245 and illustrated by block diagram 220. At this point of execution of programming code 200, there is a reference cycle or loop between the object of class B and the object of class C, but the reference cycle is reachable via variable X. The reference from the object of class A to the object of class B, however, is deleted at programming code line 250 and illustrated by block diagram 225. As a result, the reference cycle is no longer reachable via variable X (or any other variable in programming code 200). Given that the object of class B has an incoming reference from the object class C and the object of class C has an incoming reference from the object class B, objects B and C will not be deallocated via a garbage collection process that deallocates objects with zero incoming references.

While FIG. 2 provides an example of detecting two objects remaining in an unreachable reference cycle, embodiments may detect cycles of more than two objects. For example, object C may reference an object D (not illustrated) and object D may reference object B, creating a three object reference cycle. Additionally, while the example includes deleting the reference from the object of class A to the object of class B, an unreachable reference cycle may also result from another modification of the reference. For example, the reference from the object of class A to the object of class B may be modified to be directed to another object (not illustrated) that is not a part of the reference cycle.

FIG. 3 illustrates another model 300 of memory during execution of programming code 200 and modified programming code 305 including generated report 335 flagging the unreachable plurality of objects as a potential memory leak for correction. For example, model 300 may be generated using separation logic or another logical abstraction of programming code 200. Similar to the model described with reference to FIG. 2, a new object of class A is allocated using variable X in programming code line 230 and the corresponding memory is modeled in line 310 of model 300. An object of class B is allocated as a field of and referenced by the previously allocated object of class A in programming code line 235 and the corresponding memory is modeled in line 315 of model 300. An object of class C is allocated as a field of and referenced by the previously allocated object of class B in programming code line 240 and the corresponding memory is modeled in line 320 of model 300. A reference is created from the object of class C to the object of class B at programming code line 245 and the corresponding memory is modeled in line 325 of model 300. At this point of execution of programming code 200, there is a reference cycle or loop between the object of class B and the object of class C, but the reference cycle is reachable via variable X. The reference from the object of class A to the object of class B, however, is deleted at programming code line 250 and the corresponding memory is modeled in line 330 of model 300. As a result, the reference cycle is no longer reachable via variable X (or any other variable in programming code 200). Given that the object of class B has an incoming reference from the object class C and the object of class C has an incoming reference from the object class B, objects B and C will not be deallocated via a garbage collection process that deallocates objects with zero incoming references.

As described with reference to FIG. 1, embodiments detect an unreachable reference cycle using a memory model. For example, as described above, embodiments may detect the unreachable reference cycle created by the execution of programming code line 250 using line 330 of model 300. In response to detecting the unreachable reference cycle, embodiments generate a report to enable the correction of a potential memory leak. For example, programming code 305 represents programming code 200 modified to include report 335. As illustrated, report 335 is added as a comment to programming code 200 at the corresponding line of programming code that creates the unreachable reference cycle. In one embodiment, the computer maps lines of programming code 200 to lines of model 300 to enable adding a comment to the line of programming code 200 that causes the potential memory leak. In another embodiment, the report indicates the corresponding line of programming code 200 in another manner. For example, the report may include a line number or highlight the corresponding line of programming code in a graphical user interface.

Figure 4:
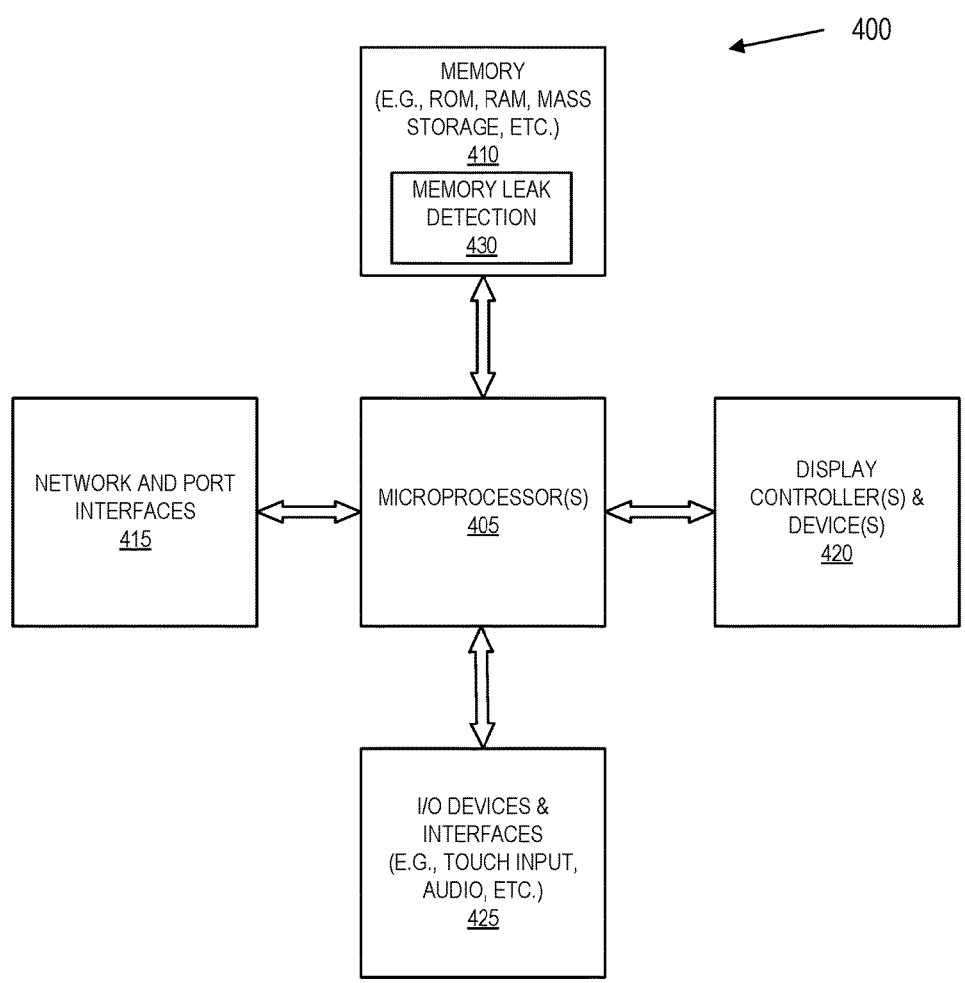
FIG. 4 illustrates, in block diagram form, an exemplary processing system to detect memory leaks caused by unreachable object reference cycles.

FIG. 4 illustrates, in block diagram form, exemplary processing system 400 to detect memory leaks caused by unreachable object reference cycles. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect data processing system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices and interfaces 425 allow a user to provide input to, receive output from, and otherwise transfer data to and from the system. I/O devices and interfaces 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses may be used to interconnect the various components shown in FIG. 4.

Data processing system 400 is an exemplary representation of the computer described above with reference to FIG. 1. Data processing system 400 may be a personal computer, tablet-style device, network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

Additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented method(s) detailed herein may be carried out in a computer system or other data processing system 400 in response to its microprocessor 405 executing sequences of instructions contained in a memory, such as memory 410 or other non-transitory machine-readable storage medium. Memory 410 is illustrated as including memory leak detection module 430. For example, memory leak detection module 430 may represent a compiler or another application executed by data processing system 400 to perform method 100. In one embodiment, the software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
parsing programming code to identify instructions within the programming code to allocate objects and instructions within the programming code to create, delete, and/or update references to the objects;
generating, based upon the identified instructions, a model of memory used when the programming code is executed, wherein the model includes representations of the objects and representations of changes to the references to the objects;
detecting, based upon the representations in the model, a potential memory leak by identifying that each of a plurality of the objects is referenced by another of the plurality of the objects but unreachable by any variable at a point of execution of the programming code; and
generating, in response to the detection of the potential memory leak, a report to flag the potential memory leak, wherein generating the report includes highlighting, in a graphical user interface, a portion of the programming code causing the potential memory leak.

2. The computer-implemented method of claim 1, wherein:
the plurality of the objects within the model includes a first object and a second object;
the references include a first reference from the first object to the second object and a second reference from the second object to the first object; and
the detection of the potential memory leak by identifying that the plurality of the objects is unreachable includes determining, at the point of execution of the programming code, that the first reference is an only incoming reference for the second object and that the second reference is the only incoming reference for the first object.

3. The computer-implemented method of claim 2, wherein a removal or modification of a third reference to the first or second object at a previous point of execution of the programming code caused the plurality of the objects to become unreachable.

4. The computer-implemented method of claim 1, wherein generating the report includes modifying the programming code to include a comment flagging the unreachable plurality of the objects.

5. The computer-implemented method of claim 1, wherein generating the report includes a recommendation to replace a strong reference with a weak reference.

6. The computer-implemented method of claim 1, wherein the model of memory is generated using separation logic.

7. The computer-implemented method of claim 1, wherein the parsing, generating the model, determining the plurality of the objects is unreachable, and generating the report are performed as a part of compilation of the programming code.

8. A non-transitory computer-readable medium storing instructions, which when executed by a processing device, cause the processing device to perform a method comprising:
parsing programming code to identify instructions within the programming code to allocate objects and instructions within the programming code to create, delete, and/or update references to the objects;
generating, based upon the identified instructions, a model of memory used when the programming code is executed, wherein the model includes representations of the objects and representations of changes to the references to the objects;
detecting, based upon the representations in the model, a potential memory leak by identifying that each of a plurality of the objects is referenced by another of the plurality of the objects but unreachable by any variable at a point of execution of the programming code; and
generating, in response to the detection of the potential memory leak, a report to flag the potential memory leak, wherein generating the report includes highlighting, in a graphical user interface, a portion of the programming code causing the potential memory leak.

9. The non-transitory computer-readable medium of claim 8, wherein:
the plurality of the objects within the model includes a first object and a second object;
the references include a first reference from the first object to the second object and a second reference from the second object to the first object; and
the detection of the potential memory leak by identifying that the plurality of the objects is unreachable includes determining, at the point of execution of the programming code, that the first reference is an only incoming reference for the second object and that the second reference is the only incoming reference for the first object.

10. The non-transitory computer-readable medium of claim 9, wherein a removal or modification of a third reference to the first or second object at a previous point of execution of the programming code caused the plurality of the objects to become unreachable.

11. The non-transitory computer-readable medium of claim 8, wherein generating the report includes modifying the programming code to include a comment flagging the unreachable plurality of the objects.

12. The non-transitory computer-readable medium of claim 8, wherein generating the report includes a recommendation to replace a strong reference with a weak reference.

13. The non-transitory computer-readable medium of claim 8, wherein the model of memory is generated using separation logic.

14. The non-transitory computer-readable medium of claim 8, wherein the parsing, generating the model, determining the plurality of the objects is unreachable, and generating the report are performed as a part of compilation of the programming code.

15. An apparatus comprising:
a processing device; and
a memory coupled to the processing device, the memory storing instructions which, when executed by the processing device, cause the apparatus to:
parse programming code to identify instructions within the programming code to allocate objects and instructions within the programming code to create, delete, and/or update references to the objects;

generate, based upon the identified instructions, a model of memory used when the programming code is executed, wherein the model includes representations of the objects and representations of changes to the references to the objects;

detect, based upon the representations in the model, a potential memory leak by identifying that each of a plurality of the objects is referenced by another of the plurality of the objects but unreachable by any variable at a point of execution of the programming code; and generate, in response to a detection of the potential memory leak, a report to flag the potential memory leak, wherein generating the report includes highlighting, in a graphical user interface, a portion of the programming code causing the potential memory leak.

16. The apparatus of claim 15, wherein:

the plurality of the objects within the model includes a first object and a second object;

the references include a first reference from the first object to the second object and a second reference from the second object to the first object; and the detection of the potential memory leak by identifying that the plurality of the objects is unreachable includes determining, at the point of execution of the programming code, that the first reference is an only incoming reference for the second object and that the second reference is the only incoming reference for the first object.

17. The apparatus of claim 16, wherein a removal or modification of a third reference to the first or second object at a previous point of execution of the programming code caused the plurality of the objects to become unreachable.

18. The apparatus of claim 15, wherein generating the report includes modifying the programming code to include a comment flagging the unreachable plurality of the objects.

19. The apparatus of claim 15, wherein generating the report includes a recommendation to replace a strong reference with a weak reference.

20. The apparatus of claim 15, wherein the model of memory is generated using separation logic.

* * * * *